(12) United States Patent
Dageville et al.

(10) Patent No.: US 7,747,606 B2
(45) Date of Patent: Jun. 29, 2010

(54) AUTOMATIC SQL TUNING ADVISOR

(75) Inventors: Benoit Dageville, Foster City, CA (US); Mohamed Ziauddin, Pleasanton, CA (US); Khaled Yagoub, San Mateo, CA (US); Mohamed Zait, San Jose, CA (US); Dinesh Das, Redwood City, CA (US); Karl Dias, Foster City, CA (US); Mark Ramacher, San Carlos, CA (US); Leng Leng Tan, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 380 days.

(21) Appl. No.: 10/936,778

(22) Filed: Sep. 7, 2004

(65) Prior Publication Data

US 2005/0125427 A1 Jun. 9, 2005

Related U.S. Application Data

(60) Provisional application No. 60/500,490, filed on Sep. 6, 2003.

(51) Int. Cl.
*G06F 7/00* (2006.01)
*G06F 17/30* (2006.01)

(52) U.S. Cl. ........................ 707/713; 707/759
(58) Field of Classification Search ........... 707/1–100 S
See application file for complete search history.

(56) References Cited

U.S. PATENT DOCUMENTS

| | | | |
|---|---|---|---|
| 5,544,355 A * | 8/1996 | Chaudhuri et al. | 707/2 |
| 5,724,569 A | 3/1998 | Andres | |
| 5,794,227 A | 8/1998 | Brown | |
| 5,860,069 A | 1/1999 | Wright | |
| 5,963,933 A | 10/1999 | Cheng et al. | |
| 5,963,934 A | 10/1999 | Cochrane et al. | |
| 6,052,694 A | 4/2000 | Bromberg | |
| 6,195,653 B1 | 2/2001 | Bleizeffer et al. | |
| 6,212,514 B1 | 4/2001 | Eberhard et al. | |
| 6,275,818 B1 | 8/2001 | Subramanian et al. | |
| 6,321,218 B1 | 11/2001 | Guay et al. | |
| 6,330,552 B1 | 12/2001 | Farrar et al. | |
| 6,353,818 B1 | 3/2002 | Carino, Jr. | |
| 6,366,901 B1 | 4/2002 | Ellis | |
| 6,366,903 B1 | 4/2002 | Agrawal et al. | |
| 6,374,257 B1 | 4/2002 | Guay et al. | |
| 6,397,207 B1 | 5/2002 | Bleizeffer et al. | |
| 6,460,027 B1 * | 10/2002 | Cochrane et al. | 707/2 |
| 6,460,043 B1 | 10/2002 | Tabbara et al. | |
| 6,513,029 B1 | 1/2003 | Agrawal et al. | |

(Continued)

OTHER PUBLICATIONS

Office Action dated Apr. 20, 2007 for U.S. Appl. No. 10/936,449.

(Continued)

*Primary Examiner*—John R. Cottingham
*Assistant Examiner*—Michael Pham
(74) *Attorney, Agent, or Firm*—Vista IP Law Group, LLP

(57) ABSTRACT

A method for receiving a database query language statement and performance information about the statement at an optimizer and generating one or more tuning actions for the statement with the performance information is disclosed.

22 Claims, 4 Drawing Sheets

U.S. PATENT DOCUMENTS

| | | | |
|---|---|---|---|
| 6,529,901 | B1 | 3/2003 | Chaudhuri et al. |
| 6,571,233 | B2 | 5/2003 | Beavin et al. |
| 6,594,653 | B2 | 7/2003 | Colby et al. |
| 6,598,038 | B1 * | 7/2003 | Guay et al. ............... 707/2 |
| 6,721,724 | B1 | 4/2004 | Galindo-Legaria et al. |
| 6,728,720 | B1 | 4/2004 | Lenzie |
| 6,763,353 | B2 * | 7/2004 | Li et al. ............... 707/4 |
| 6,816,874 | B1 | 11/2004 | Cotner et al. |
| 6,839,713 | B1 | 1/2005 | Shi et al. |
| 6,850,925 | B2 | 2/2005 | Chaudhuri et al. |
| 6,865,567 | B1 | 3/2005 | Oommen et al. |
| 6,912,547 | B2 | 6/2005 | Chaudhuri et al. |
| 6,915,290 | B2 | 7/2005 | Bestgen et al. |
| 6,931,389 | B1 | 8/2005 | Bleizeffer et al. |
| 6,934,701 | B1 | 8/2005 | Hall, Jr. |
| 6,947,927 | B2 | 9/2005 | Chaudhuri et al. |
| 6,999,958 | B2 | 2/2006 | Carlson et al. |
| 7,007,013 | B2 | 2/2006 | Davis et al. |
| 7,031,958 | B2 | 4/2006 | Santosuosso |
| 7,047,231 | B2 | 5/2006 | Grasshoff et al. |
| 7,058,622 | B1 | 6/2006 | Tedesco |
| 7,146,363 | B2 | 12/2006 | Waas et al. |
| 7,155,426 | B2 | 12/2006 | Al-Azzawe |
| 7,155,459 | B2 * | 12/2006 | Chaudhuri et al. ........ 707/200 |
| 7,272,589 | B1 | 9/2007 | Guay et al. |
| 7,302,422 | B2 | 11/2007 | Bossman et al. |
| 7,353,219 | B2 | 4/2008 | Markl et al. |
| 2002/0073086 | A1 | 6/2002 | Thompson et al. |
| 2002/0120617 | A1 | 8/2002 | Yoshiyama et al. |
| 2003/0018618 | A1 | 1/2003 | Bestgen et al. |
| 2003/0065648 | A1 | 4/2003 | Driesch et al. |
| 2003/0088541 | A1 | 5/2003 | Zilio et al. |
| 2003/0093408 | A1 * | 5/2003 | Brown et al. .............. 707/2 |
| 2003/0110153 | A1 | 6/2003 | Shee |
| 2003/0115183 | A1 | 6/2003 | Abdo et al. |
| 2003/0126143 | A1 | 7/2003 | Roussopoulos et al. |
| 2003/0154216 | A1 | 8/2003 | Arnold et al. |
| 2003/0182276 | A1 * | 9/2003 | Bossman et al. ........... 707/3 |
| 2003/0187831 | A1 | 10/2003 | Bestgen et al. |
| 2003/0200204 | A1 | 10/2003 | Limoges et al. |
| 2003/0200537 | A1 | 10/2003 | Barsness et al. |
| 2003/0229621 | A1 | 12/2003 | Carlson et al. |
| 2004/0002957 | A1 * | 1/2004 | Chaudhuri et al. ........... 707/2 |
| 2004/0003004 | A1 * | 1/2004 | Chaudhuri et al. ......... 707/200 |
| 2004/0034643 | A1 | 2/2004 | Bonner et al. |
| 2004/0181521 | A1 | 9/2004 | Simmen et al. |
| 2004/0210563 | A1 | 10/2004 | Zait et al. |
| 2004/0215626 | A1 | 10/2004 | Colossi et al. |
| 2005/0033734 | A1 | 2/2005 | Chess et al. |
| 2005/0097078 | A1 | 5/2005 | Lohman et al. |
| 2005/0102305 | A1 | 5/2005 | Chaudhuri et al. |
| 2005/0125427 | A1 | 6/2005 | Dageville et al. |
| 2006/0167883 | A1 | 7/2006 | Boukobza |
| 2007/0038618 | A1 | 2/2007 | Kosciusko et al. |

OTHER PUBLICATIONS

Office Action dated May 2, 2007 for U.S. Appl. No. 10/935,908.
Office Action dated Apr. 19, 2007 for U.S. Appl. No. 10/936,205.
Office Action dated Sep. 6, 2007 for U.S. Appl. No. 10/936,205.
Office Action dated Feb. 7, 2007 for U.S. Appl. No. 10/936,781.
Office Action dated Jul. 30, 2007 for U.S. Appl. No. 10/936,781.
Office Action dated Feb. 22, 2007 for U.S. Appl. No. 10/936,468.
Office Action dated Aug. 22, 2007 for U.S. Appl. No. 10/936,468.
Office Action dated Jan. 25, 2007 for U.S. Appl. No. 10/935,906.
Office Action dated Aug. 9, 2007 for U.S. Appl. No. 10/935,906.
Office Action dated Jan. 24, 2007 for U.S. Appl. No. 10/936,779.
Office Action dated Aug. 22, 2007 for U.S. Appl. No. 10/936,779.
Office Action dated Mar. 9, 2007 for U.S. Appl. No. 10/936,469.
Office Action dated Oct. 17, 2007 for U.S. Appl. No. 10/936,469.
Office Action dated May 1, 2007 for U.S. Appl. No. 10/936,426.
Office Action dated Sep. 6, 2007 for U.S. Appl. No. 10/936,426.
Office Action dated Jan. 26, 2007 for U.S. Appl. No. 10/936,427.
Office Action dated Aug. 22, 2007 for U.S. Appl. No. 10/936,427.
Avnur, R. et al. "Eddies: Continuously Adaptive Query Processing" Proceedings of the 2000 ACM SIGMOD International Conference on Management of Data (SIGMOD '00), Dallas, TX, May 15-18, 2000, pp. 261-272.
Blakeley, J.A. et al. "Experiences Building the Open OODB Query Optimizer" Proceedings of the 1993 ACM SIGMOD International Conference on Management of Data (SIGMOD '93), Washington, DC, May 25-28, 1993, pp. 287-296.
Bruno, N. et al. "STHoles: A Multidimensional Workload-Aware Histogram" Proceedings of the 2001 ACM SIGMOD International Conference on Management of Data (SIGMOD '01), Santa Barbara, CA, May 21-24, 2001, pp. 211-222.
Bruno, N. et al. "Exploiting Statistics on Query Expressions for Optimization" Proceedings of the 2002 ACM SIGMOD International Conference on Data Management (SIGMOD '02), Madison, WI, Jun. 4-6, 2002, pp. 263-274.
Chaudhuri, S. "An Overview of Query Optimization in Relational Systems" Proceedings of the ACM SIGACT-SIGMOD-SIGART Symposium on Principles of Database Systems (PODS '98), Seattle, WA, Jun. 1-4, 1998, pp. 34-43.
Chaudhuri, S. et al. "Rethinking Database System Architecture: Towards a Self-Tuning RISC-style Database System" Proceedings of the 26th International Conference on Very Large Databases (VLDB 2000), Cairo, Egypt, Sep. 10-14, 2000, pp. 1-10.
Chen, C.M. et al. "Adaptive Selectivity Estimation Using Query Feedback" Proceedings of the 1994 ACM SIGMOD International Conference on Management of Data (SIGMOD '94), Minneapolis, MN, May 24-27, 1994, pp. 161-172.
Derr, M.A. "Adaptive Query Optimization in a Deductive Database System" Proceedings of the 2nd International Conference on Information and Knowledge Management (CIKM '93), Washington, DC, Nov. 1-5, 1993, pp. 206-215.
Ganek, A.G. et al. "The dawning of the autonomic computing era" IBM Systems Journal, 2003, vol. 42, No. 1, pp. 5-18.
Gassner, P. et al. "Query Optimization in the IBM DB2 Family" Data Engineering, Dec. 1993, vol. 16, No. 4, pp. 4-18.
Getoor, L. et al. "Selectivity Estimation using Probabilistic Models" Proceedings of the 2001 ACM SIGMOD International Conference on Management of Data (SIGMOD '01), Santa Barbara, CA, May 21-24, 2001, pp. 461-472.
Gorman, T. "The Search for Intelligent Life in the Cost-Based Optimizer" Jul. 2001, v1.0, pp. 1-11.
IBM "DB2 Universal Database Slashes Administration Costs by Reducing Time Spent on Administrative Tasks by up to 65 Percent" MarketWire, Sep. 9, 2004, pp. 1-3, located at http://www.marketwire.com/mw/release_html-b1?release_id=72387.
Ives, Z.G. et al. "An Adaptive Query Execution System for Data Integration" Proceedings of the 1999 ACM SIGMOD International Conference on Management of Data (SIGMOD '99), Philadelphia, PA, Jun. 1-3, 1999, pp. 299-310.
Lightstone, S.S. et al. "Toward Autonomic Computing with DB2 Universal Database" ACM SIGMOD Record, Sep. 2002, vol. 31, No. 3, pp. 55-61.
Markl, V. et al. "LEO: An autonomic query optimizer for DB2" IBM Systems Journal, 2003, vol. 42, No. 1, pp. 98-106.
Scheuermann, P. et al. "Adaptive Algorithms for Join Processing in Distributed Database Systems" Distributed and Parallel Databases, 1997, vol. 5, pp. 233-269.
Slivinskas, G. et al. "Adaptable Query Optimization and Evaluation in Temporal Middleware" Proceedings of the 2001 ACM SIGMOD International Conference on Management of Data (SIGMOD '01), Santa Barbara, CA, May 21-24, 2001, pp. 127-138.
Valentin, G. et al. "DB2 Advisor: An Optimizer Smart Enough to Recommend Its Own Indexes" Proceedings of the 16th International Conference on Data Engineering, Feb. 29-Mar. 3, 2000, pp. 101-110.
Zilio, D. et al. "Self-Managing Technology in IBM DB2 Universal Database8" Proceedings of the 10th International Conference on Information and Knowledge Management (CIKM '01), Atlanta, GA, Nov. 5-10, 2001, pp. 541-543.

Ioannidis et al, "Parametric Query Optimization", Proceedings of the 18 VLDB Conference, Vancouver, BC, Canada 1992, pp. 103-114.
Office Action dated Nov. 25, 2008 for U.S. Appl. No. 10/935,906.
Office Action dated Apr. 9, 2008 for U.S. Appl. No. 10/935,906.
Office Action dated Oct. 31, 2008 for U.S. Appl. No. 10/936,779.
Office Action dated May 13, 2008 for U.S. Appl. No. 10/936,779.
Office Action dated Dec. 15, 2008 for U.S. Appl. No. 10/936,426.
Office Action dated Sep. 23, 2008 for U.S. Appl. No. 10/936,426.
Office Action dated Mar. 20, 2008 for U.S. Appl. No. 10/936,426.
Office Action dated Oct. 16, 2008 for U.S. Appl. No. 10/936,205.
Office Action dated Mar. 24, 2008 for U.S. Appl. No. 10/936,205.
Office Action dated Nov. 10, 2008 for U.S. Appl. No. 10/936,781.
Office Action dated Apr. 1, 2008 for U.S. Appl. No. 10/936,781.
Office Action dated Oct. 15, 2008 for U.S. Appl. No. 10/936,468.
Office Action dated Apr. 2, 2008 for U.S. Appl. No. 10/936,468.
Office Action dated Sep. 22, 2008 for U.S. Appl. No. 10/936,449.
Office Action dated Oct. 20, 2008 for U.S. Appl. No. 10/935,908.
Office Action dated Jul. 17, 2008 for U.S. Appl. No. 10/935,908.
Office Action dated Mar. 18, 2008 for U.S. Appl. No. 10/936,427.
Office Action dated Apr. 30, 2008 for U.S. Appl. No. 10/935,908.
Office Action dated Dec. 29, 2008 for U.S. Appl. No. 10/936,468.
Office Action dated Dec. 11, 2008 for U.S. Appl. No. 10/936,469.
Office Action dated May 29, 2008 for U.S. Appl. No. 10/936,469.
Markl et al. "Learning Table Access Cardinalities with LEO" SIGMOD '02; Jun. 3-6, 2002, p. 613.
Stillger et al. "LEO—DB2's Learning Optimizer" VLDB 2001.
Notice of Allowance dated Apr. 16, 2009 for U.S. Appl. No. 10/936,426.
Office Action dated Apr. 29, 2009 for U.S. Appl. No. 10/936,781.
Office Action dated Apr. 29, 2009 for U.S. Appl. No. 10/935,908.
Office Action dated May 12, 2009 for U.S. Appl. No. 10/936,779.
Notice of Allowance dated May 6, 2009 for U.S. Appl. No. 10/936,205.
Office Action dated Sep. 6, 2007 for U.S. Appl. No. 10/936,449.
Office Action dated Mar. 28, 2008 for U.S. Appl. No. 10/936,449.
Office Action dated March 4, 2009 for U.S. Appl. No. 10/936,449.
Office Action dated April 3, 2009 for U.S. Appl. No. 10/936,468.
Office Action dated May 11, 2009 for U.S. Appl. No. 10/935,906.
Office Action dated May 28, 2009 for U.S. Appl. No. 10/936,469.
Office Action dated March 31, 2009 for U.S. Appl. No. 10/936,427.
Final Office Action dated Dec. 8, 2009 for U.S. Appl. No. 10/936,779.
Final Office Action dated Nov. 20, 2009 for U.S. Appl. No. 10/935,906.
Final Office Action dated Nov. 12, 2009 for U.S. Appl. No. 10/936,781.
Notice of Allowance dated Sep. 29, 2009 for U.S. Appl. No. 10/936,205.
Final Rejection dated Nov. 12, 2009 for U.S. Appl. No. 10/936,468.
Office Action dated Nov. 27, 2009 for U.S. Appl. No. 10/935,908.
Notice of Allowance dated Sep. 23, 2009 for U.S. Appl. No. 10/936,449.
Notice of Allowance dated Jan. 27, 2010 for U.S. Appl. No. 10/936,781.
Notice of Allowance dated Apr. 19, 2010 for U.S. Appl. No. 10/935,908.

* cited by examiner

AUTOMATIC SQL TUNING ADVISOR

CROSS-REFERENCE TO RELATED APPLICATIONS

This application claims the benefit of U.S. Provisional Application No. 60/500,490, filed Sep. 6, 2003, which is incorporated herein by reference in its entirety. This application is related to applications "SQL TUNTNG SETS," with U.S. application Ser. No. 10/936,449, now published as U.S. Publication No. 2005/0125393; "SQL PROFILE," with U.S. application Ser. No. 10/936,205, now published as U.S. Publication No. 2005/0125452; "GLOBAL HINTS," with U.S. application Ser. No. 10/936,781, now published as U.S. Publication No. 2005/0125398; "SQL TUNING BASE," with U.S. application Ser. No. 10/936,468, now published as U.S. Publication No. 2005/0097091; "AUTOMATIC LEARNING OPTIMIZER," with U.S. application Ser. No. 10/935,906, now published as U.S. Publication No. 2005/0119999; "AUTOMATIC PREVENTION OF RUN-AWAY QUERY EXECUTION," with U.S. application Ser. No. 10/936,779, now published as U.S. Publication No. 2005/0177557; "METHOD FOR INDEX TUNING OF A SQL STATEMENT, AND INDEX MERGING FOR A MULTI-STATEMENT SQL WORKLOAD, USING A COST-BASED RELATIONAL QUERY OPTIMIZER," with U.S. application Ser. No. 10/936,469, now published as U.S. Publication No. 2005/0187917; "SQL STRUCTURE ANALYZER," with U.S. application Ser. No. 10/936,426, now published as U.S. Publication No. 2005/0120001; "HIGH LOAD SQL DRIVEN STATISTICS COLLECTION," with U.S. application Ser. No. 10/936,427, now published as U.S. Publication No. 2005/0138015; "AUTO-TUNING SQL STATEMENTS," with U.S. application Ser. No. 10/935,908, now published as U.S. Publication No. 2005/0120000; all of which are filed Sep. 7, 2004 and are incorporated herein by reference in their entirety.

FIELD OF THE INVENTION

This invention is related to the field of electronic database management.

BACKGROUND

SQL tuning is a very critical aspect of database performance tuning. It is an inherently complex activity requiring a high level of expertise in several domains: query optimization, to improve the execution plan selected by the query optimizer; access design, to identify missing access structures; and SQL design, to restructure and simplify the text of a badly written SQL statement. Furthermore, SQL tuning is a time consuming task due to the large volume and evolving nature of the SQL workload and its underlying data.

Typically the database administrator (DBA) or an application developer performs the tuning process. However, it is often a very challenging task. First, it requires a high level of expertise in several complex areas: query optimization, access design, and SQL design. Second, it is a time consuming process because each statement is unique and needs to be tuned individually. Third, it requires an intimate knowledge of the database (i.e., view definitions, indexes, table sizes, etc.) as well as the application (e.g. process flow, system load). Finally, the SQL tuning activity is a continuous task because the SQL workload and the database are always changing.

For example, a compiler relies on data and system statistics to function properly. It uses the number of blocks and number of rows in order to cost the full scan of a table, when selecting the best access path to retrieve a table's data. These statistics may be missing or stale. In addition to base statistics, the compiler also can use statistics on intermediate results. For example, the compiler can estimate the number of rows from applying table filters when deciding which join algorithm to pick. These statistics are derived from base statistics using various methods, e.g., probabilistic models. These statistics may also be missing or stale.

Examples of factors that lead the optimizer to generate a sub-optimal plan include missing or stale base statistics, wrong estimates of intermediate result sizes, and incorrect settings for environmental parameters. Missing statistics cause the optimizer to apply guesses. For example, the optimizer assumes uniform data distribution even when the column used in a predicate is skewed, if there is no histogram. Wrong estimate of intermediate result sizes. For example, the predicate (filter or join) is too complex to use standard statistical methods to derive the number of rows (e.g., the columns are compared thru a complex expression like $(a*b)/c=10$). Inadequate settings for the environment parameters used during the optimization process. For example, the user may set a parameter to tell the query optimizer that it intends to fetch the complete result set produced by the query while it actually fetches only a few rows. In this case, the query optimizer will favour plans that return the complete result fast, while a better plan would be the one that returns the first few rows (e.g., 10) fast.

However, when a user performs a manual tuning process, tuning information can be collected from several different sources. The user often does not know how to integrate these different types of information. Also, the user typically does not know which factors to use to correct the plan. To help the DBA and the application developer overcome these challenges, several software companies have developed diagnostics tools that help identify SQL performance issues and suggest actions to fix them. However, these tools are not integrated with the query optimizer, the system component that is most responsible for SQL performance. Indeed, these tools interpret the optimization information outside of the database to perform the tuning, so their tuning results are less robust and limited in scope. Moreover, they cannot directly tackle the internal challenges faced by the query optimizer in producing an optimal execution plan. Finally, the recommended actions often require modification of the SQL text in the application source code, making the recommendations hard to implement by the DBA.

For example, the LEO (LEarning Optimizer) research project at IBM attempts to correct errors in the cardinality estimates made by the query optimizer. The corrections are done based on actual cardinality values gathered during query execution. The corrections are computed as adjustments to the optimizer's estimates and stored in dictionary tables. When a SQL statement is submitted to the query optimizer, the query optimizer will first check whether any adjustments are available as a result of a previous execution of a related query and if they do then it will apply them. However, LEO does not compensate for stale or missing statistics on base objects (e.g., number of distinct value of a column). LEO also does not automatically choose the appropriate optimization mode.

Also, a number of commercial products assist a DBA in some aspects of tuning-inefficient SQL statements. None, however, provide a complete tuning solution, partly because they are not integrated with the database server. For example, Quest Software's SQLab Vision provides a mechanism for identifying high load SQL based on several measures of resource utilization. It also can rewrite SQL statements into semantically equivalent, but potentially more efficient, alternative forms and suggests creation of indexes to offer more efficient access path to the data. Since the product resides outside of the RDBMS, the actual benefit of these recommendations to a SQL statement is unknown until they are actually implemented and executed.

LeccoTech's SQLExpert is a toolkit that scans new applications for problematic SQL statements as well as high load SQL statements in the system. It generates alternative execution plans for a SQL statement by rewriting it into all possible semantically equivalent forms. There are three problems with this approach. First, it cannot identify all the ways of rewriting a SQL statement (which is normally the domain of a query optimizer). Second, equivalent forms of a SQL statement do not guarantee that the query optimizer will find an efficient execution plan if the bad plan is a result of errors in the optimizer's internal estimates like cardinality of intermediate results. Third, all the alternative plans will have to be executed to actually determine which, if any, is superior to the default execution plan.

Microsoft SQL Server offers an Index Wizard to provide recommendations to the DBA on the indexes that can potentially improve the query execution plans.

SUMMARY

The Tuning Advisor takes one or more database query language statements, performs an automatic tuning process for each statement, and produces well-tuned plans along with integrated tuning advice for the statements. For example, the tuning advisor can generate tuning recommendations, such as: automated access path analysis to check for missing indices; automatic statement structure analysis to check for badly written statements; and automatic data statistics analysis to check for missing or stale data statistics. These different sources of tuning information are integrated by the advisor to produce one or more tuning recommendations for the statement. For each recommendation, the advisor can also generate a rationale, to help the user understand the reasons for the recommendation. The rationale can also include a cost of the execution plan that is generated 'before applying the recommendations, and a cost' of the execution plan that is generated after applying the recommendations.

DETAILED DESCRIPTION

Overview

The embodiments of the invention are described using the term "SQL", however, the invention is not limited to just this exact database query language, and indeed may be used in conjunction with other database query languages and constructs.

A SQL tuning advisor is able to automatically tune a SQL statement by automatically identifying high load or top SQL statements that are responsible for a large share of the application workload and system resources based on the past SQL execution history available in the system, automatically generate ways to improve execution plans produced by a compiler for these statements, and automatically perform corrective actions to generate better execution plans for poorly performing SQL statements.

For example, the SQL tuning advisor can allow a compiler to find a better plan by automatically gathering or refreshing the data statistics used to build an execution plan. The tuning advisor can also automatically change the value of configuration parameters that will affect the optimizer behavior. In addition, optimizer tuning actions to the statement can be associated with the statement. The tuning advisor can also recommend a rewrite of the SQL statement to enable more efficient data processing by using more appropriate SQL constructs, or create or drop a data access structure on a table. The recommendations can be automatically implemented. Each recommendation has a benefit that is associated with it. A rationale can be associated with the recommendation, and can include the reasons for making the recommendation, as well as a cost of the plan both before and after implementing the recommendations. The rationale can also contain the old and new execution plans for the statement. The recommendations can also be manually reviewed by a database administrator before implementation. For example, the tuning advice generated by the optimizer can be integrated with the user interface, so that alternatives can be presented to the DBA, who then makes a selection. Thus, the automatic SQL tuning advisor provides a mechanism for control over the tuning process.

Automatic SQL Tune Advisor Architecture

Figure 1:
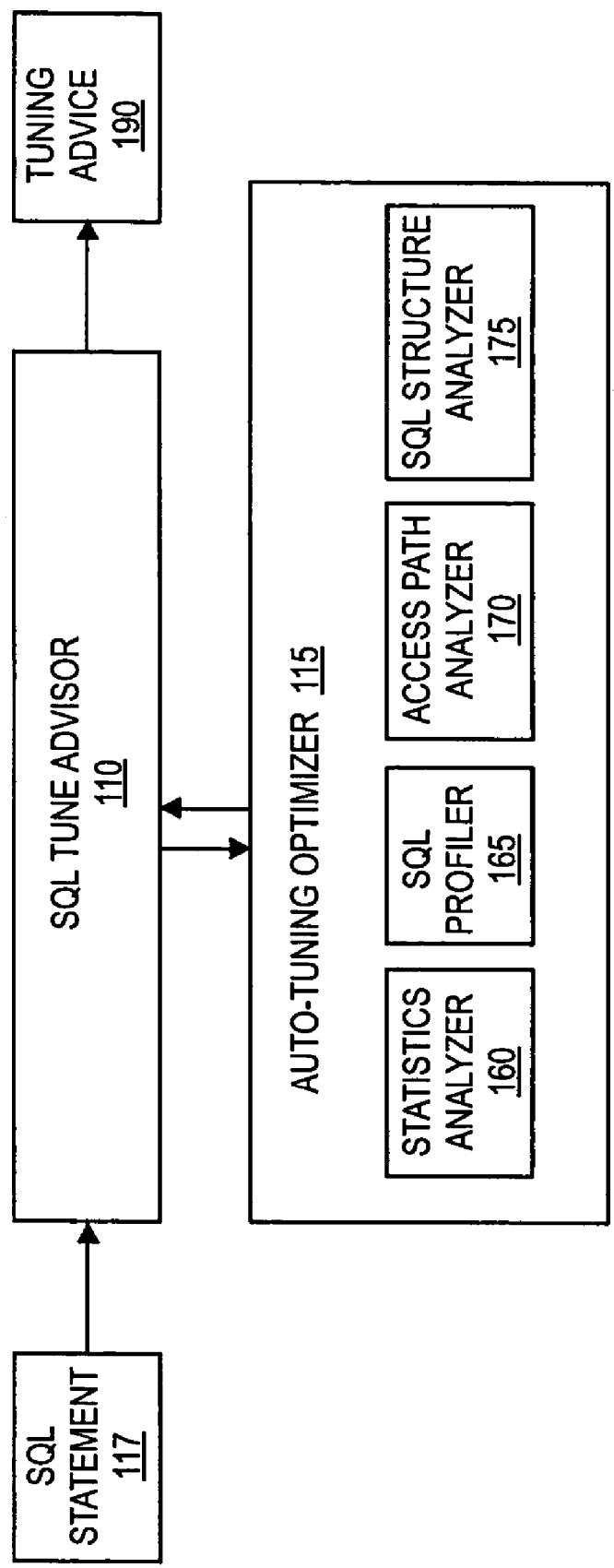
FIG. 1 shows the Automatic SQL Tuning architecture and the functional relationship between its two sub-components.

The Automatic SQL tuning process is implemented by the Automatic Tuning Optimizer, which performs several tuning analyses during the process. The output of a tuning analysis is a set of tuning recommendations, which may be presented to the user. FIG. 1 shows the Automatic SQL Tuning architecture and the functional relationship between its two sub-components. The automatic SQL tune advisor 110 receives a SQL statement 117 and information to tune the statement. The tune advisor 110 provides the statement and its related information to auto-tuning optimizer 115. The optimizer automatically tunes the statement with the information by performing auto-tuning processes. The statistics analyzer 160 generates adjustment factors to correct missing or stale statistics. The SQL profiler 165 generates customized information for the statement in the form of a profile. The access path analyzer 170 generates indexes. The SQL structure analyzer 175 generates recommendations for rewriting the statement.

There are several advantages from using the query optimizer as the basis for the Automatic SQL Tuning process. The tuning is done by the same component that is responsible for picking the execution plan, and knows best what additional information help produce a better plan. Future enhancements to the query optimizer are automatically taken into account in the tuning process. The tuning process uses the execution history of a SQL statement and customizes the optimizer settings for that SQL statement because it knows the effect of a particular setting and the query performance.

A query optimizer normally has stringent constraints on the amount of time and system resources it can use to find a good execution plan for a given SQL statement. For example, it is allotted an optimization budget in the form of a number of join permutations. Therefore, it uses a combination of cost-based and heuristics-based techniques to reduce the optimization time. Furthermore, it cannot validate the size estimates of intermediate results when standard derivation methods are known to cause large errors, e.g., in presence of complex expressions. Most validation techniques require running part of the query on a sample of the input data. As a consequence, a sub-optimal plan can be generated.

In contrast, the Automatic Tuning Optimizer is given a generous time budget, e.g., 30 minutes, to perform necessary investigation and verification steps as part of the tuning process. Thus, it has a much better chance of generating a well-tuned plan. The Automatic Tuning Optimizer uses dynamic sampling and partial execution (i.e. execute fragments of the SQL statement) techniques to verify its internal estimates of cardinality, cost, etc. It also uses the past execution history of the SQL statement to determine appropriate settings of optimization parameters.

The SQL Tuning Advisor accepts a SQL statement and passes it to the Automatic Tuning Optimizer along with other input parameters, such as a time limit. The Automatic Tuning Optimizer then performs different tuning analyses while building a query plan. The tuning analyses may produce one or more tuning recommendations as an output. The Automatic Tuning Optimizer results are relayed to the user via the SQL Tuning Advisor in the form of tuning advice. The advice can include one or more recommendations, each with a rationale and an estimate of the benefit. The user is given an option to accept one or more recommendations, thus completing the tuning of the corresponding SQL statement.

The SQL Tuning Advisor invokes the query optimizer in an automatic tuning mode to perform tuning functions such as statistics analysis, plan tuning analysis, access path analysis, and SQL structural analysis. The output of the tuning advisor is therefore an integrated set of recommendations generated from multiple sources. The resulting advice is in the form of one or more recommendations, each with a rationale and an estimated benefit obtained when implemented. Each recommendation contains enough information for the database system to automatically execute the recommendation to generate an improved execution plan. The rationale can provide an explanation to the user of how the recommendation improves the resulting execution plan for the statement. The rationale can also contain the old query plan which was generated without the recommendations, and the new query plan, which implemented the recommendations, so that the user can compare and contrast the changes to the execution plan caused by implementing the recommendations. Also, the costs of the old and new plans can be included in the rationale. The recommendations can be stored in a computer memory device, such as a disk or other persistent storage device, so that the tuning process can be later resumed by the user. The user is given an option to accept the advice, thus completing the tuning of the high load SQL statements.

SQL Profiling

A profiling process is performed by the optimizer during the tuning process to adjust statistics that are used in generating an execution plan for a SQL statement. The profiling process verifies that statistics are not missing or stale, validates the estimates made by the query optimizer for intermediate results, and determines the correct optimizer settings. The Automatic Tuning Optimizer builds a SQL Profile from the tuning information it generates during the statistics analysis (e.g., provides missing statistics for an object), validation of intermediate results estimate, and detection of the best setting for optimizer parameters. When a SQL Profile is built, the Automatic Tuning Optimizer generates a user recommendation to accept a SQL profile.

During the SQL Profiling process, a statistics analysis is performed to verify that statistics are not missing or stale. In one embodiment, the query optimizer logs the types of statistics that are actually used during the plan generation process, in preparation for the verification process. For example, when a SQL statement contains an equality predicate, it logs the column number of distinct values, whereas for a range predicate it logs the minimum and maximum column values information. Once the logging of used statistics is complete, the query optimizer checks if each of these statistics is available on the associated query object (i.e. table, index or materialized view). If the statistic is available then it verifies whether the statistic is up-to-date. To verify the accuracy of a statistic, it samples data from the corresponding query object and compares it to the statistic. If a statistic is found to be missing, the query optimizer will generate auxiliary information to supply the missing statistic. If a statistic is available but stale, it will generate auxiliary information to compensate for staleness. Also during SQL Profiling, the Automatic Tuning Optimizer validates the estimates made by the query optimizer, and compensates for missing information or wrong estimates. The validation process may involve running part of the query on a sample of the input data.

The Automatic Tuning Optimizer can use the past execution history of a SQL statement to determine the correct optimizer settings. For example, if the execution history shows that a SQL statement is only partially executed in the majority of times then the appropriate setting will be to optimize it for first n rows, where n is derived from the execution history. This constitutes a customized parameter setting for the SQL statement. (Note that past execution statistics are available in the Automatic Workload Repository (AWR) presented later).

Figure 2:
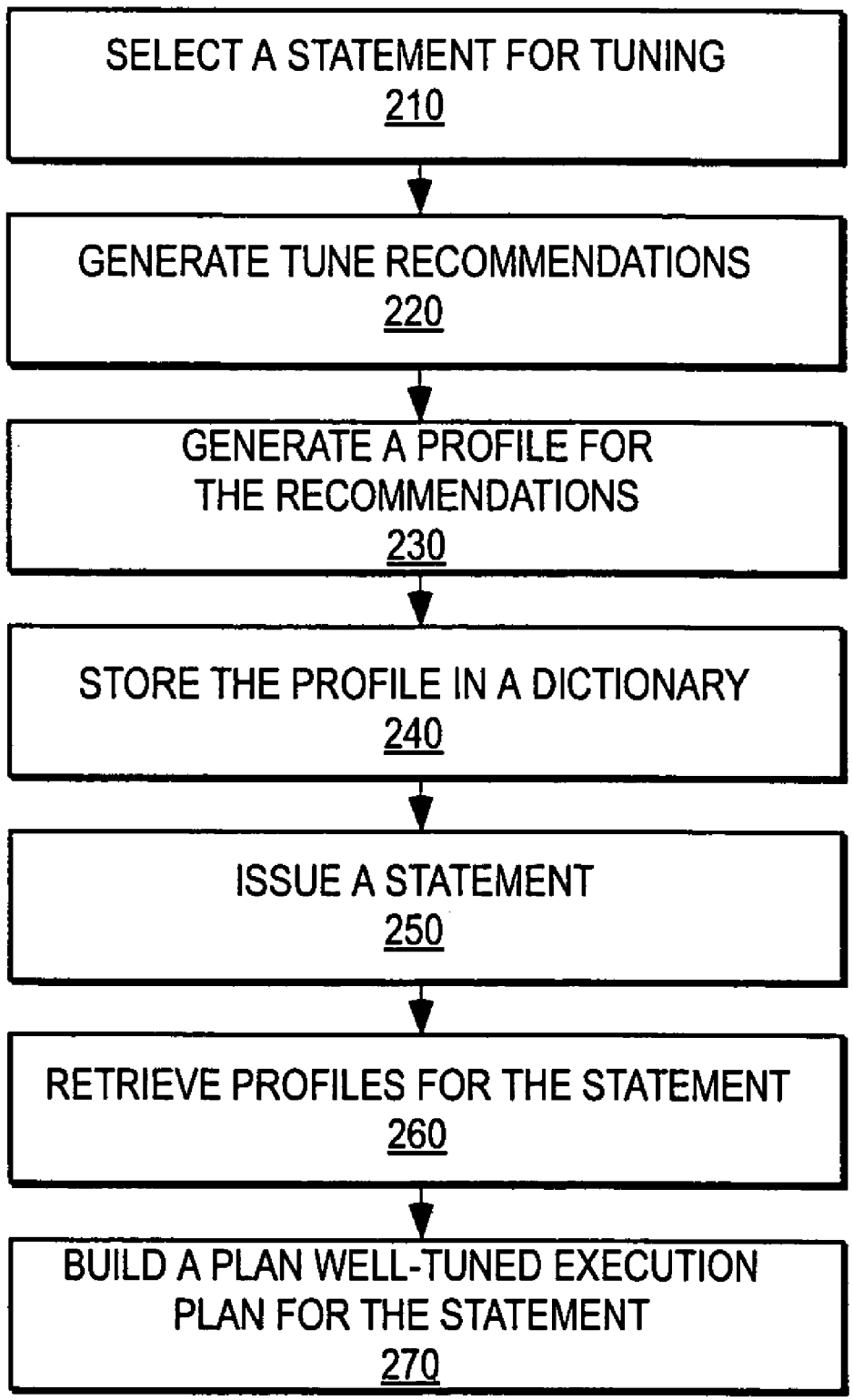
FIG. 2 shows the process flow of the creation and use of a SQL Profile.

The tuning information produced from the statistics, estimates, and optimizer settings analyses can be represented as a SQL Profile data structure and stored in a SQL Tuning Base. Once the SQL Profile is created, it is used in conjunction with the existing statistics by the optimizer to produce a well-tuned plan for the corresponding SQL statement. FIG. 2 shows the process flow of the creation and use of a SQL Profile. The process can have two separate phases: an Automatic SQL Tuning phase, and a regular optimization phase. During the Automatic SQL Tuning phase, a DBA selects a SQL statement 210 and runs the SQL Tuning Advisor. The SQL Tuning Advisor invokes the Automatic Tuning Optimizer to generate tuning recommendations, 220. The Automatic Tuning Optimizer generates a SQL Profile along with other recommendations, 230. After a SQL Profile is built, it is stored in the data dictionary, once it is accepted by the user, 240. Later, during the regular optimization phase, a user issues the same SQL statement, 250. The query optimizer finds the matching SQL profiles from the data dictionary, 260, and uses the SQL profile information to build a well-tuned execution plan, 270. The use of SQL Profiles is completely transparent to the user. The creation and use of a SQL Profile doesn't require changes to the application source code. Therefore, SQL profiling provides a way to tune SQL statements issued from packaged applications where the users have no access to or control over the application source code. Additional details of SQL Profiling are described in co-pending U.S. application Ser. No. 10/936,449 for "SQL PROFILE," filed Sep. 7, 2004.

Access Path Analysis

Automatically creating index structures provides an automated tuning technique that can significantly improve the performance of SQL statements when the amount of data fetched from an object is a small fraction of the data stored on disk. The Automatic Tuning Optimizer recommends the creation of indexes based on the data access patterns of the SQL statement being tuned, and recommends an index when the query performance can be improved by replacing a full table scan by an index range scan.

The Automatic Tuning Optimizer analyzes a SQL statement to determine candidate indices that could improve the performance of the statement were they to be created. This analysis can result in the discovery of several promising indices. The following are examples of the techniques that are used to identify such indices. An equality predicate on a column, e.g., State='CA'. In this case, an index with State as a leading column allows the query to access only the relevant rows from the table and avoid a full scan. A predicates on several columns, e.g., State='CA' AND Age=33. In this case, a multi-column index on State and Age is considered a candidate. The query contains an order by on a column, then creating an index on that column will help eliminate the sort operation, since the index scan returns the rows in the desired order. (Note that these indices do not actually exist). Once candidate indexes are identified, the next step is to verify their effectiveness. To do that, the Automatic Tuning Optimizer derives statistics for each candidate index based on the statistics of its table and relevant columns. It then invokes the Oracle optimizer in the regular mode to optimize the SQL statement, by pretending that the indices really exist. If the plan selected by the optimizer uses one or more of the candidate indices, then the Automatic Tuning Optimizer recommends that the user create those indices.

One characteristic of access path analysis is its tight integration with the optimizer. This ensures that any improvements in the optimizer also apply to the Automatic Tuning Optimizer when running under access path analysis mode. Since the Automatic Tuning Optimizer does not do an analysis of how its index recommendations are going to affect the entire SQL workload, it also recommends running the Access Advisor on the SQL statement along with a representative SQL workload. The Access Advisor collects advice given on each statement of a SQL workload, and consolidates them into a global advice for the entire SQL workload. The Access Advisor also recommends other types of access structures like materialized views, as well as indices on the recommended materialized views. Additional descriptions of access path analysis can be found in co-pending U.S. application Ser. No. 10/936,205 for "A METHOD FOR INDEX TUNING OF A SQL STATEMENT, AND INDEX MERGING FOR A MULTI-STATEMENT SQL WORKLOAD, USING A COST-BASED RELATIONAL QUERY OPTIMIZER," filed Sep. 7, 2004.

SQL Structure Analysis

Often a SQL statement can be a high load statement simply because it is badly written. This usually happens when there are different, but not necessarily semantically equivalent, ways to write a statement to produce same result. Knowing which of these alternate forms is most efficient is a difficult and daunting task for application developers since it requires both a deep knowledge about the properties of data they are querying as well as a very good understanding of the semantics and performance of SQL constructs. Besides, during the development cycle of an application, developers are generally more focused on how to write SQL statements that produce desired results than improve the performance.

There are various reasons related to the structure of a SQL statement that can cause poor performance. Some reasons are syntax-based, some are semantics-based, and some are purely design issues. Examples of syntax-based constructs are generally related to how predicates are specified in a SQL statement. For example, a predicate involving a function or expression (e.g. func(col)=:bnd, col1+col2=:bnd) on an indexed column prevents the query optimizer from using an index as an access path. Therefore, rewriting the statement by simplifying such complex predicates can enable index access paths leading to a better execution plan. An example of a semantic-based construct is a SQL construct such as UNION, when replaced by a corresponding but not semantically equivalent UNION-ALL construct can result in a significant performance boost. However, this replacement is performed if the result does not have duplicate rows. If this is the case, it is prudent to use UNION-ALL thus eliminating an expensive duplicate elimination step from the execution plan. Another example is the use of NOT IN sub-query while a NOT EXIST sub-query could have produced same result much more efficiently. An example of a design issue is an accidental use of a cartesian product, for example, occurs when one of the tables is not joined to any of the other tables in a SQL statement. This can happen especially when the query involves a large number of tables and the application developer is not very careful in checking all join conditions. Another example is the use of an outer-join instead of an inner-join when the referential integrity together with non-null property of the join key is maintained in the application.

The SQL structure analysis performed by the ATO detects poor SQL constructs falling in one or more categories listed above. The SQL structure analysis is fully cost-based and it is performed in two steps. In the first step, the ATO generates internal annotations and diagnostic information, and associates them to the execution plan operators. The annotations are produced while the ATO is evaluating the various choices during the process of building the execution plan. Each annotation can be quite extensive and includes the reasons for making a decision as well as the alternatives that were considered and the corresponding reasons for rejecting them. For example, when the ATO explores the possibility of merging a view, it will check necessary conditions to see if it is logically possible to merge the view. If not possible, it will record the reason for not merging the view. If it can merge but it decides not to merge the view, it will again record the reason for not doing so.

The second step of the analysis takes place after the optimal execution plan has been built. During this step, the ATO examines the costly operators in the annotated execution plan. For example, a costly operator can be defined as one whose individual cost is more than 10% of the total plan cost. The ATO examines the annotations associated with each of the costly operators and produces appropriate recommendations. The ATO also provides rationale behind each of its recommendations. For example, why a recommended SQL construct in place of the original one will improve the cost and hence the performance.

Since the implementation of SQL structure recommendations involves rewriting the problematic SQL statements, the SQL structure analysis is much more effective for SQL that is being developed but not yet deployed into a production system or a packaged application. Another important benefit of the SQL structure recommendations is that it can help educate the developers in writing well-formed SQL statements. Additional details of structure analyzing can be found in co-pending U.S. application Ser. No. 10/936,426 for "SQL STRUCTURE ANALYZER," filed Sep. 7, 2004.

Automatic SQL Tuning

The SQL Tuning process is automated by the automatic tuning capability of the query optimizer 351, which is exposed via the SQL Tuning Advisor 350. The Advisor takes SQL statements that have been identified as high load as inputs, and provides advice on how to improve their performance.

Figure 3:
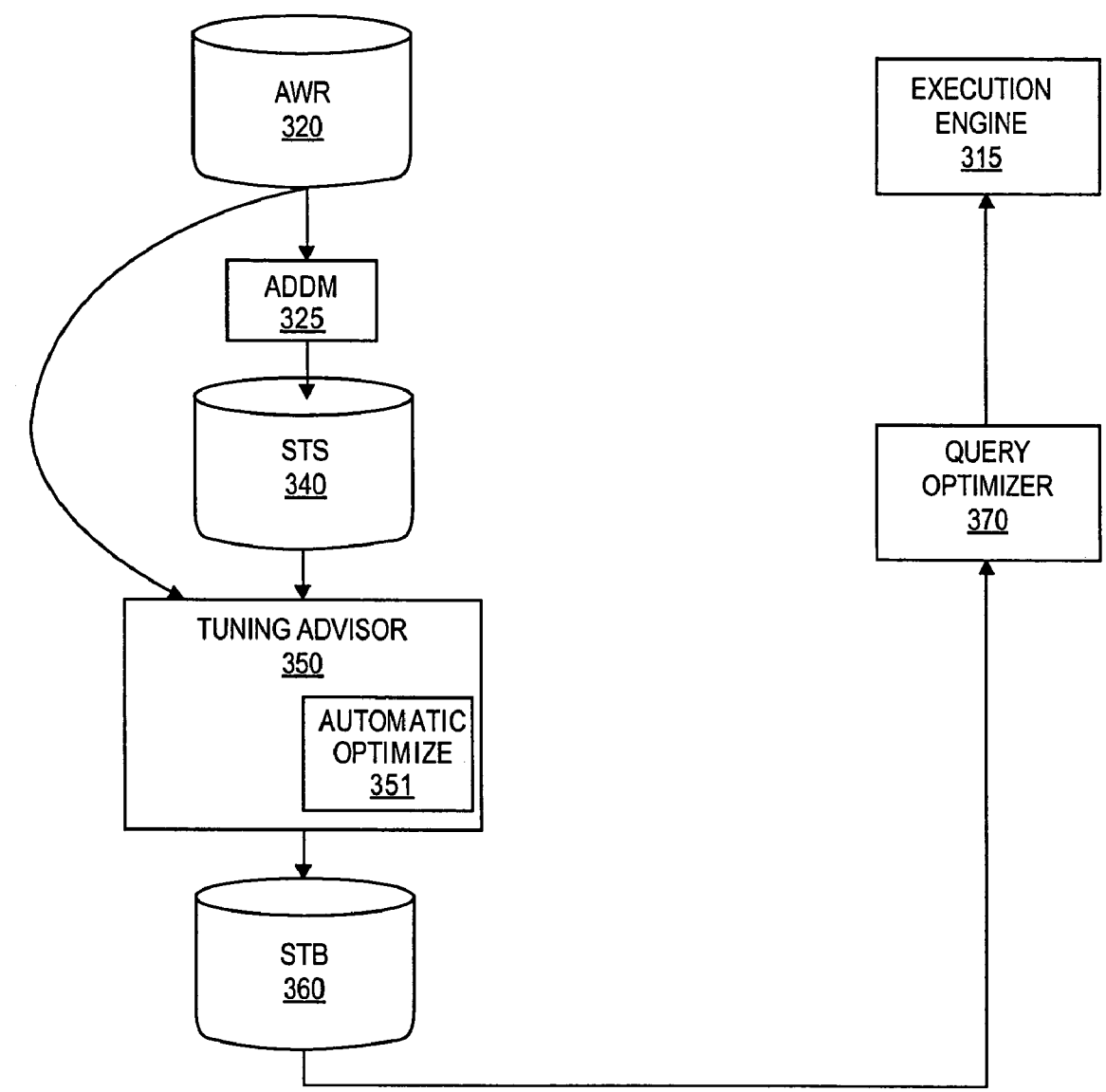
FIG. 3 represents an illustration of a device to automatically perform the SQL tuning process.

A system for automatically tuning SQL statements is shown in FIG. 3. In the area of SQL tuning, the task of identifying high load SQL has been automated by an Automatic Database Diagnostics Monitor (ADDM) 325, which continuously monitors the database system activity and load, collects and inspects system performance data, and determines potential performance bottlenecks. This data for identifying high load SQL can be stored in a SQL Tuning Set 340, for use as input to the Tuning Advisor 350. Another source of data from which top SQL is identified is the Automatic Workload Repository (AWR) 320, which periodically looks at performance data generated by execution engine 315, and stores the performance data persistently as historical statistics. For example, the AWR can identify SQL statements that are resource intensive in terms of CPU consumption, buffer gets, disk reads, parse calls, or shared memory. Thus, the AWR contains a history of the system workload.

The Automatic SQL Tuning process, which is integrated with the query optimizer, provides part of a manageability framework for a self-managing database. The Automatic SQL Tuning process tunes SQL statements and produces a set of comprehensive tuning recommendations. The recommendations can be automatically executed by the system, or can be presented to a user for approval. The user may decide whether to accept the recommendations. A tuning object called the SQL Tuning Set provides a store for a SQL workload to be automatically tuned. With the automatic tuning process, automatic tuning results can scale over a large number of queries and can evolve over time with changes in the application workload and the underlying data. Automatic SQL tuning is also far cheaper than manual tuning. Together, these reasons position automatic SQL tuning as an effective and economical alternative to manual tuning.

Figure 4:
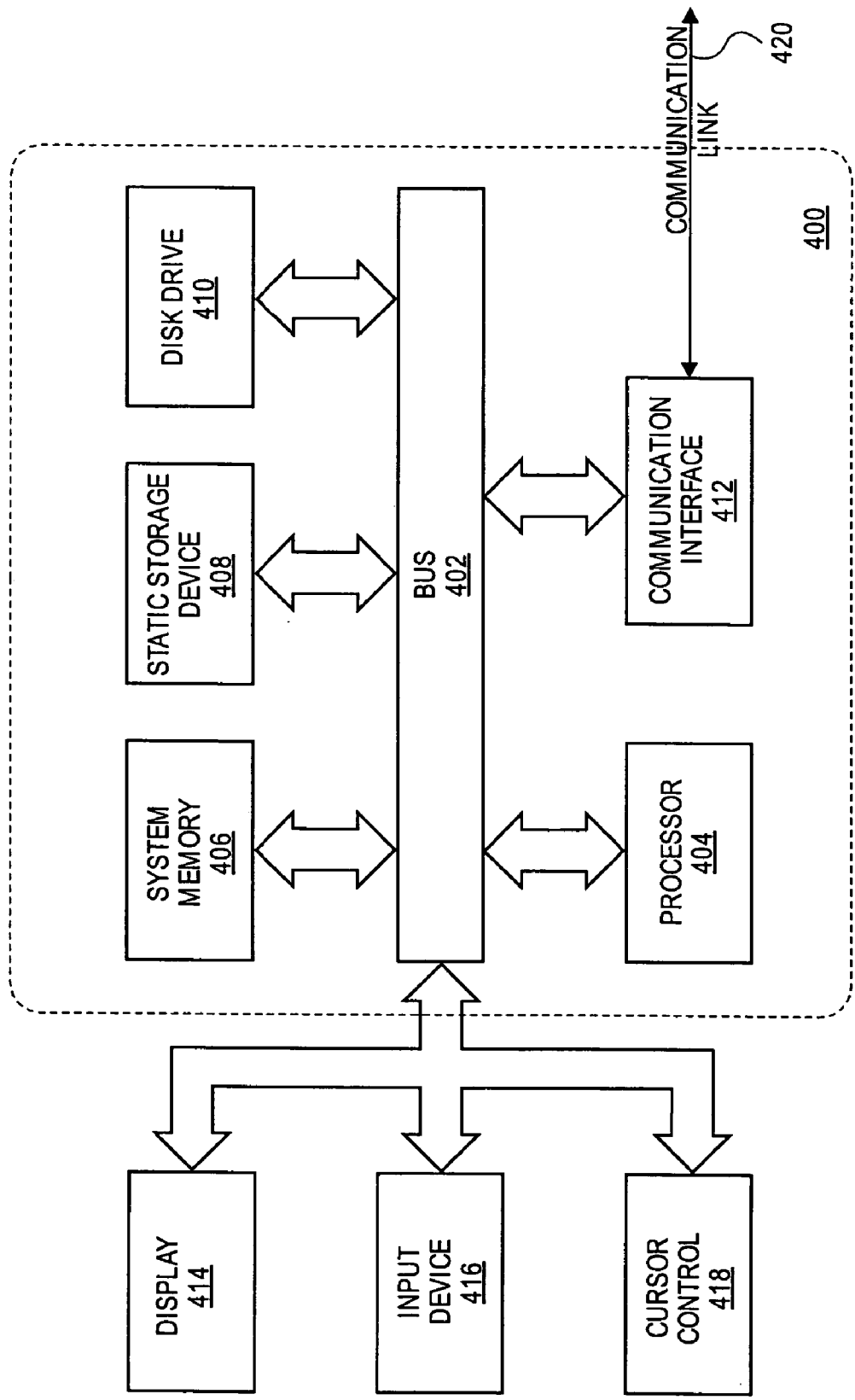
FIG. 4 is a block diagram of a computer system suitable for implementing an embodiment of the automatic SQL tuning advisor.

FIG. 4 is a block diagram of a computer system 400 suitable for implementing an embodiment of the SQL Tuning Advisor. Computer system 400 includes a bus 402 or other communication mechanism for communicating information, which interconnects subsystems and devices, such as processor 404, system memory 406 (e.g., RAM), static storage device 408 (e.g., ROM), disk drive 410 (e.g., magnetic or optical), communication interface 412 (e.g., modem or ethernet card), display 414 (e.g., CRT or LCD), input device 416 (e.g., keyboard), and cursor control 418 (e.g., mouse or trackball).

According to one embodiment of the invention, computer system 400 performs specific operations by processor 404 executing one or more sequences of one or more instructions contained in system memory 406. Such instructions may be read into system memory 406 from another computer readable medium, such as static storage device 408 or disk drive 410. In alternative embodiments, hard-wired circuitry may be used in place of or in combination with software instructions to implement the invention.

The term "computer readable medium" as used herein refers to any medium that participates in providing instructions to processor 404 for execution. Such a medium may take many forms, including but not limited to transmission media/medium and computer readable storage media/medium such as non-volatile media and volatile media. Non-volatile media includes, for example, optical or magnetic disks, such as disk drive 410. Volatile media includes dynamic memory, such as system memory 406. Transmission media includes coaxial cables, copper wire, and fiber optics, including wires that comprise bus 402. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In an embodiment of the invention, execution of the sequences of instructions to practice the invention is performed by a single computer system 400. According to other embodiments of the invention, two or more computer systems 400 coupled by communication link 420 (e.g., LAN, PTSN, or wireless network) may perform the sequence of instructions to practice the invention in coordination with one another. Computer system 400 may transmit and receive messages, data, and instructions, including program, i.e., application code, through communication link 420 and communication interface 412. Received program code may be executed by processor 404 as it is received, and/or stored in disk drive 410, or other non-volatile storage for later execution.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

We claim:

1. A computer implemented method, comprising:
using a computer system which comprises at least one computer processor and is programmed for performing:
receiving a database query language statement and performance information about the database query language statement at an optimizer;
receiving a time budget for tuning the database query language statement;
generating one or more tuning recommendations for the database query language statement,
wherein
the one or more tuning recommendations are generated based at least in part upon the performance information with consideration of the time budget, the one or more tuning recommendations comprise one or more rewrites of database query language text for the database query language statement,
the generating the one or more tuning recommendations further comprises:
performing an automatic access path analysis to recommend one or more indices based at least in part on one or more data access patterns of the database query language statement and upon when the database query language statement performance is improved by replacing one or more existing access path by one or more new index access paths,
performing an automatic structure analysis that generates one or more tuning recommendations for one or more rewrites for the database query language statement, and
performing an automatic statistics analysis that generates adjustment factors to correct one or more missing or stale statistics,
at least one of the one or more rewrites of the database query language text is not semantically equivalent to the database query language text of the database query language statement in that the at least one of the one or more rewrites of the database query language text comprises a second query operator function which is used to replace a different, first query operation function in the database query language text of the database query language statement and the one or more rewrites of the database query language text produces an equivalent query result as the database query language text of the database query language statement does, and at least one of the one or more tuning recommendations is associated with a rationale to help a user understand the at least one of the one or more tuning recommendations, in which the rationale comprises information about an execution plans before applying the at least one of the one or more tuning recommendations and one or more first execution plans that are generated after applying the at least one of the one or more tuning recommendations; and displaying the one or more tuning recommendations on a display device or storing the one or more tuning recommendations in data structures configured for the tuning recommendations on a computer readable storage medium of the computer system.

2. The computer implemented method of claim 1, wherein each of the one or more tuning recommendations includes information for a database system to automatically execute the one or more tuning recommendations.

3. The computer implemented method of claim 1, further comprising:
storing the one or more tuning recommendations in a memory device;
retrieving the one or more tuning recommendations that are stored; and
generating one or more additional recommendations.

4. The computer implemented method of claim 1, further comprising:
displaying the one or more recommendations to a user;
receiving a selection of a subset of the one or more tuning recommendations from the user; and
determining a benefit for the subset of the one or more tuning recommendations.

5. The computer implemented method of claim 1, wherein generating the one or more tuning recommendations is performed automatically.

6. The computer implemented method of claim 1, wherein the database query language statement is a SQL statement.

7. An apparatus, comprising:
a computer readable storage medium that holds computing instructions for execution;
at least one computer processor that executes the computing instructions, wherein the computing instructions comprise:
integrating tuning advice for a high load statement from a plurality of sources;
receiving a time budget for tuning the high load statement; and
generating one or more tuning recommendations from the tuning advice with consideration of the time budget, wherein
the one or more tuning recommendations comprise one or more rewrites of database query language text for the high load statement, and
the generating the one or more tuning recommendations further comprises:

performing an automatic access path analysis to recommend one or more indices based at least in part on one or more data access patterns of the high load statement and upon when performance of the high load statement is improved by replacing one or more existing access path by one or more new index access paths,
performing an automatic structure analysis that generates one or more tuning recommendations for one or more rewrites for the high load statement, and
performing an automatic statistics analysis that generates adjustment factors to correct one or more missing or stale statistics, at least one of the one or more rewrites of the database query language text is not semantically equivalent to the database query language text of the high load statement in that the at least one of the one or more rewrites of the database query language text comprises a second query operator function which is used to replace a different, first query operation function in the database query language text of the high load statement and the one or more rewrites of the database query language text produces an equivalent query result as the database query language text of the high load statement does, and at least one of the one or more tuning recommendations is associated with a rationale to help a user understand the at least one of the one or more tuning recommendations, in which the rationale comprises information about an execution plans before applying the at least one of the one or more tuning recommendations and one or more first execution plans that are generated after applying the at least one of the one or more tuning recommendations.

8. The apparatus of claim 7, wherein one of the sources is selected from the group consisting of:
means for analyzing the accuracy of statistics related to the high load statement;
means for correcting inaccurate statistics;
means for storing a profile of auxiliary information related to the high load statement;
means for analyzing an access path related to the high load statement; and
means for generating the profile for the statement.

9. The apparatus of claim 7, further comprising: means for presenting the one or more recommendations to a user.

10. The apparatus of claim 9, further comprising: means for selecting one or more of the presented recommendations.

11. The apparatus of claim 10, further comprising: means for generating a tuned execution plan for the high load statement based on the selected recommendations.

12. The apparatus of claim 7, wherein the high load statement is a SQL statement.

13. A computer readable storage medium storing a computer program having a sequence of instructions which, when executed by a processing system, causes the processing system to perform a process, the process comprising:
using the processing system which comprises at least one computer processor and is programmed for performing:
receiving a database query language statement and performance information about the database query language statement at an optimizer;
receiving a time budget for tuning the database query language statement; and
generating one or more tuning recommendations for the database query language statement,
wherein
the one or more tuning recommendations are generated based at least in part upon the performance information with consideration of the time budget, the one or more tuning recommendations comprise one or more rewrites of database query language text for the database query language statement, the generating the one or more tuning recommendations further comprises:

performing an automatic access path analysis to recommend one or more indices based at least in part on one or more data access patterns of the database query language statement and upon when the database query language statement performance is improved by replacing one or more existing access path by one or more new index access paths, performing an automatic structure analysis that generates one or more tuning recommendations for one or more rewrites for the database query language statement, and performing an automatic statistics analysis that generates adjustment factors to correct one or more missing or stale statistics, at least one of the one or more rewrites of the database query language text is not semantically equivalent to the database query language text of the database query language statement in that the at least one of the one or more rewrites comprises a second query operation function which is used to replace a different, first query operation function in the database query language text of the database query language statement and the database query language text produces an equivalent query result as the database query language text of the database query language statement does, and at least one of the one or more tuning recommendations is associated with a rationale to help a user understand the at least one of the one or more tuning recommendations, in which the rationale comprises information about an execution plans before applying the at least one of the one or more tuning recommendations and one or more first execution plans that are generated after applying the at least one of the one or more tuning recommendations.

14. The computer readable storage medium of claim 13, wherein each of the one or more tuning recommendations comprises:

a cost benefit analysis of generating an execution plan with the one or more tuning recommendations compared to generating an execution plan without the one or more tuning recommendations.

15. The computer readable storage medium of claim 13, wherein each of the one or more tuning recommendations includes information for a database system to automatically execute the one or more tuning recommendations.

16. The computer readable storage medium of claim 13, further comprising:

storing the one or more tuning recommendations in a memory device;

retrieving the stored one or more tuning recommendations that are stored; and generating one or more additional recommendations.

17. The computer readable storage medium of claim 13, further comprising:

displaying the one or more tuning recommendations to a user;

receiving a selection of a subset of the one or more tuning recommendations from the user; and determining a benefit for the subset of the one or more tuning recommendations.

18. The computer readable storage medium of claim 13, wherein generating the one or more tuning recommendations is performed automatically.

19. The computer readable storage medium of claim 13, wherein the database query language statement comprises a SQL statement.

20. The computer implemented method of claim 1 in which the time budget comprises a time limit of at least 30 minutes.

21. The apparatus of claim 7 in which the time budget comprises a time limit of at least 30 minutes.

22. The computer readable storage medium of claim 13 in which the time budget comprises a time limit of at least 30 minutes.

* * * * *

UNITED STATES PATENT AND TRADEMARK OFFICE
CERTIFICATE OF CORRECTION

PATENT NO. : 7,747,606 B2  
APPLICATION NO. : 10/936778  
DATED : June 29, 2010  
INVENTOR(S) : Benoit Dageville et al.

Page 1 of 1

It is certified that error appears in the above-identified patent and that said Letters Patent is hereby corrected as shown below:

In column 1, line 9, delete "TUNTNG" and insert -- TUNING --, therefor.

Signed and Sealed this
Twenty-sixth Day of April, 2011

David J. Kappos
*Director of the United States Patent and Trademark Office*